US012566064B2

(12) United States Patent
Geissbühler et al.

(10) Patent No.: US 12,566,064 B2
(45) Date of Patent: Mar. 3, 2026

(54) TWIST AND TILT VERIFICATION USING DIFFRACTION PATTERNS

(71) Applicant: Axcelis Technologies, Inc., Beverly, MA (US)

(72) Inventors: Phillip Geissbühler, Winchester, MA (US); FHM Faridur Rahman, Boxford, MA (US); Neil Bassom, Hamilton, MA (US)

(73) Assignee: Axcelis Technologies, Inc., Beverly, MA (US)

( * ) Notice: Subject to any disclaimer, the term of this patent is extended or adjusted under 35 U.S.C. 154(b) by 0 days.

(21) Appl. No.: 18/892,499

(22) Filed: Sep. 22, 2024

(65) Prior Publication Data

US 2025/0116512 A1 Apr. 10, 2025

Related U.S. Application Data

(60) Provisional application No. 63/540,255, filed on Sep. 25, 2023.

(51) Int. Cl.
 *G01B 11/30* (2006.01)
(52) U.S. Cl.
 CPC .................................. *G01B 11/303* (2013.01)
(58) Field of Classification Search
 CPC .. G01B 11/26; G01B 11/303; G01B 2210/56; H01L 21/67288; H01L 22/12

USPC .......................................................... 356/600
See application file for complete search history.

(56) References Cited

U.S. PATENT DOCUMENTS

| | | | | |
|---|---|---|---|---|
| 5,189,490 A | * | 2/1993 | Shetty ................... | G01B 11/303 |
| | | | | 356/600 |
| 6,031,607 A | * | 2/2000 | Miyazaki ................ | G06T 7/001 |
| | | | | 359/559 |
| 7,656,540 B2 | * | 2/2010 | Girard ................... | G01B 11/026 |
| | | | | 356/614 |
| 2004/0063232 A1 | * | 4/2004 | Komatsu ............... | G06T 7/0004 |
| | | | | 438/18 |
| 2021/0262950 A1 | * | 8/2021 | Blasenheim ........ | G03F 7/70625 |
| 2023/0296510 A1 | * | 9/2023 | Xu ..................... | G01N 21/4788 |
| | | | | 356/337 |

OTHER PUBLICATIONS

WIPO, International Search Report and Written Opinion issued for PCT/US2024/048201, Jan. 22, 2025.

* cited by examiner

*Primary Examiner* — Tri T Ton
(74) *Attorney, Agent, or Firm* — Hodgson Russ LLP

(57) ABSTRACT

A light source directs an incident beam at a surface of the workpiece on a stage at an oblique angle. A detector images a diffraction pattern of the incident beam reflected off the workpiece. At least one of a twist angle and a tilt angle of the workpiece on the stage is determined based on the diffraction pattern. The workpiece may be a semiconductor wafer and the stage may be, for example, part of an ion implanter.

20 Claims, 17 Drawing Sheets

200

30° INCIDENT
TWIST 0°

30° INCIDENT
TWIST -4°

30° INCIDENT
TWIST 4°

45° INCIDENT
TWIST 0°

45° INCIDENT
TWIST -4°

45° INCIDENT
TWIST 4°

SHIFT IN
DEGREES, mm

-4°        0°        4°

300

301

324

304

316

314

322

326

328

306

318  320

VACUUM
SOURCE

330

308

302

POWER
SUPPLY

310

SOURCE
GAS

312

332  CONTROLLER

TWIST AND TILT VERIFICATION USING DIFFRACTION PATTERNS

CROSS-REFERENCE TO RELATED APPLICATIONS

This application claims priority to the provisional patent application filed Sep. 25, 2023 and assigned U.S. App. No. 63/540,255, the disclosure of which is hereby incorporated by reference.

FIELD OF THE DISCLOSURE

This disclosure relates to process control during workpiece processing.

BACKGROUND OF THE DISCLOSURE

In the manufacture of semiconductor devices, ion implantation is used to dope semiconductors with impurities. Ion implantation systems are often used to implant a workpiece, such as a semiconductor wafer, with ions from an ion beam to produce n-type or p-type material doping or to form passivation layers during fabrication of an integrated circuit. Such beam treatment can selectively implant the workpieces with impurities of a specified dopant material, at a predetermined energy level, and in controlled concentration to produce a semiconductor material during fabrication of an integrated circuit. When used for doping semiconductor wafers, the ion implantation system injects a selected ion species into the workpiece to produce the desired extrinsic material. Implanting ions generated from source materials such as antimony, arsenic, or phosphorus, for example, results in an "n-type" extrinsic material workpiece, whereas a "p-type" extrinsic material workpiece often results from ions generated with source materials such as boron, gallium, or indium.

A typical ion implanter includes an ion source, an ion extraction device, a mass analysis device, a beam transport device, and a process chamber. The ion source generates ions of desired atomic or molecular dopant species. These ions are extracted from the source by an extraction system, typically a set of electrodes, which energize and direct the flow of ions from the source, forming an ion beam. Desired ions are separated from the ion beam in a mass analysis device, typically a magnetic dipole performing mass dispersion or separation of the extracted ion beam. The beam transport device, typically a vacuum system containing a series of focusing devices, transports the ion beam to the workpiece processing device while maintaining desired properties of the ion beam. Finally, workpieces are transferred in to and out of the process chamber via a workpiece handling system, which may include one or more robotic arms, for placing a workpiece to be treated in front of the ion beam and removing treated workpieces from the ion implanter.

BRIEF SUMMARY OF THE DISCLOSURE

A system is provided in a first embodiment. The system includes a chamber, a stage configured to hold a workpiece, a light source configured to direct an incident beam at a surface of the workpiece on the stage, a detector configured to image a diffraction pattern of the incident beam reflected off the workpiece, and a processor in electronic communication with the detector. The stage is disposed within the chamber. The incident beam is directed at the surface of the workpiece at an oblique angle. The processor is configured to determine at least one of a twist angle and a tilt angle of the workpiece on the stage based on the diffraction pattern. The detector may be a camera and the stage may be an electrostatic chuck. The light source may be a laser and the incident beam may be predominantly red light. The incident beam may have a diameter from 0.5 mm to 0.7 mm. The incident beam may be incident on the workpiece at an angle from 30° to 60°.

In an instance, the chamber has a base. The stage can be configured to hold the workpiece parallel to an inner surface of the base. The stage also can be configured to hold the workpiece perpendicular to an inner surface of the base.

In an instance, the chamber has a chamber surface. The incident beam can be reflected off the workpiece onto the chamber surface. The diffraction pattern can be imaged on the chamber surface by the detector. The detector also may directly receive the incident beam reflected off the workpiece.

Determining at least one of the twist angle and the tilt angle may include determining a circle center shift of the diffraction pattern. Determining at least one of the twist angle and the tilt angle also may include determining a curvature of the diffraction pattern and determining a center of the workpiece.

The processor may be further configured to analyze a speckle pattern of the diffraction pattern thereby determining a surface measurement of the workpiece.

A method is provided in a second embodiment. The method includes directing an incident beam from a light source at a workpiece on a stage in a chamber. The incident beam is directed at a surface of the workpiece at an oblique angle. The incident beam reflects off the surface of the workpiece. A diffraction pattern of the incident beam that is reflected off the workpiece is imaged. Using a processor, at least one of a twist angle and a tilt angle of the workpiece on the stage is determined based on the diffraction pattern. The workpiece may be a patterned semiconductor wafer. The light source may be a laser and the incident beam may be predominantly red light. The incident beam may have a diameter from 0.5 mm to 0.7 mm. The incident beam may be incident on the workpiece at an angle from 30° to 60°.

The method may include twisting and/or tilting the workpiece on the stage based on the twist angle and/or the tilt angle.

Determining at least one of the twist angle and the tilt angle can include determining a circle center shift of the diffraction pattern. Determining at least one of the twist angle and the tilt angle also can include determining a curvature of the diffraction pattern and determining a center of the workpiece.

The method may include analyzing a speckle pattern of the diffraction pattern using the processor thereby determining a surface measurement of the workpiece.

A non-transitory computer-readable storage medium is disclosed in a third embodiment. The non-transitory computer-readable storage medium comprises one or more programs for executing the following steps on one or more computing devices. A diffraction pattern of an incident beam of light reflected off a surface of a workpiece on a stage is received. The incident beam is directed at the surface of the workpiece at an oblique angle. At least one of a twist angle and a tilt angle of the workpiece on the stage is determined based on the diffraction pattern.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
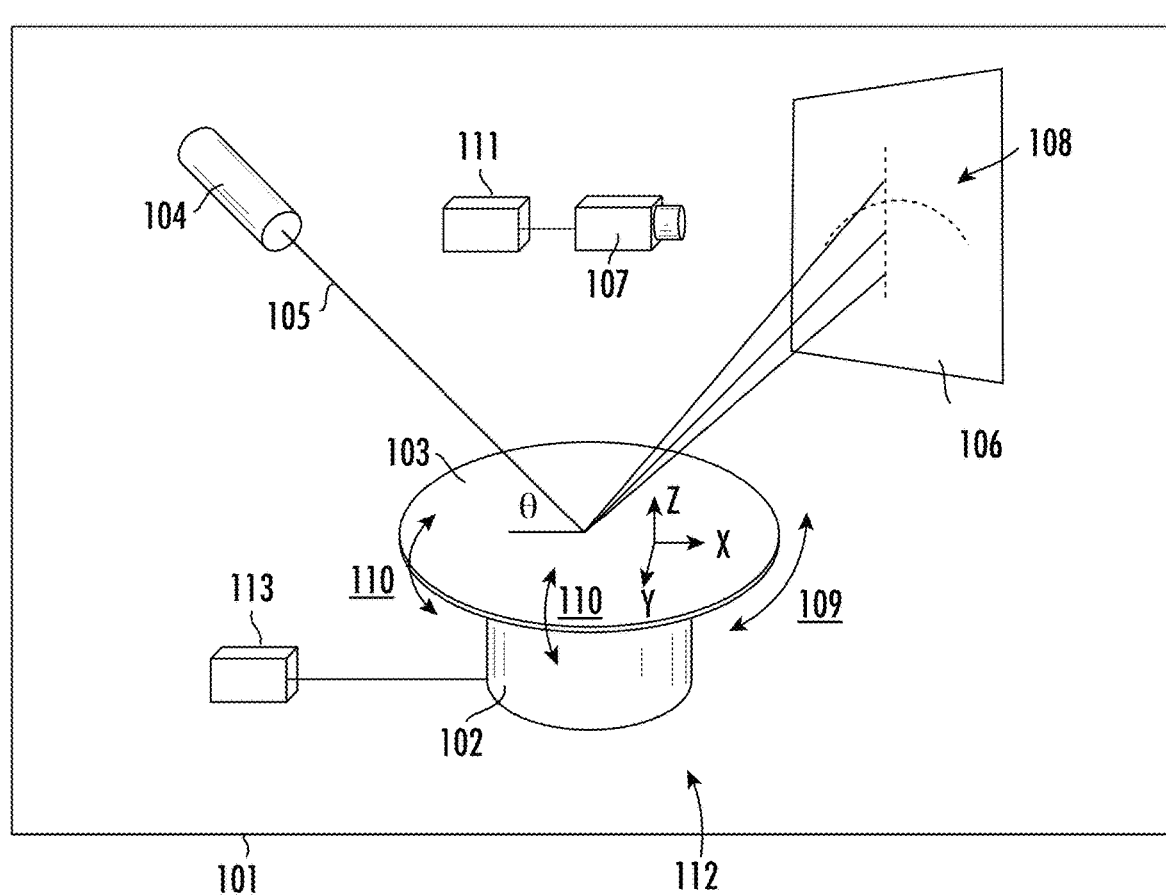
FIG. 1 is a diagram of an exemplary system for determining twist and tilt of a workpiece in accordance with the present disclosure.

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

A stage, such as an electrostatic chuck, can be used to hold the workpiece in a path of the ion beam. The twist and tilt angles of the workpiece with respect to the ion beam are set for the beam to impinge on the workpiece surface at the correct angles. Positional placement of the workpiece on the electrostatic chuck is important for dose uniformity. For some implants, such as high-energy implants, the ion beam aligns to the channeling direction of the silicon. Such a high-energy implant may need an angular accuracy of at least 0.05 degrees. Bowing, especially seen on thin workpieces, can affect the angle distributions of the ion beam as it enters a surface of the workpiece. Bowing of a wafer can affect the resulting dose or angular accuracy of an implant.

Often, more than one implanted pattern is needed on the same workpiece. In that case, a high level of accuracy needs to be maintained not only during one implant step, but through multiple implant steps. The accuracy becomes even more important with three-dimensional structures because an incorrect alignment can cause shadowing. Shadowing can lead to an incorrect implant dose in the desired locations.

The workpiece may be transferred multiple times between a load lock and the stage if multiple implants are performed on a workpiece, which can introduce positioning error in both the x-direction and y-direction on the stage as well as with angular position. The stage itself also may be incorrectly positioned or calibrated, which can further affect alignment of the workpiece. Alignment errors in the workpiece can negatively affect the results of ion implantation. Similar effects can occur if the workpiece is incorrectly placed during deposition, etching, or other processes.

It may be difficult to use sensors on the stage to determine the twist and tilt in the process chamber environment with high vacuum, high and low temperatures, and cleanliness requirements. However, the inventors recognized and appreciated that a light beam projected at a workpiece, such as a semiconductor wafer or other substrate, can be used to determine the twist and tilt of the workpiece on the stage. Light reflected off the surface of the workpiece creates a diffraction pattern. This technique avoids problems if a sensor on the stage is not calibrated correctly. This technique also avoids adding complex sensors in an environment that can have extreme temperatures, vacuum conditions, and/or exacting cleanliness requirements. Measurement and alignment are performed using the features printed on the top surface of the workpiece, which is what the ion beam will be interacting with.

Patterned workpieces are directional in terms of an integrated circuit surface or subsurface structural array. A light beam produces a characteristic diffraction pattern when the light beam is focused at an incident angle on a workpiece having an array of integrated circuit features. The integrated circuit features may be repeated over an area comparable to a size of an incident beam of light. For example, the workpiece may include memory devices or other devices. The array may be lines of photoresist or other structural features on or in the workpiece. This diffraction pattern can be, for example, scattering spots. The spots can fit to a circular and/or line-like shape along an X-Y direction. The diffraction pattern shows a correlative X-Y shift for even a small change in twist (e.g., 0±1°). The main reflected spot shift along the X-X and Y-Y axes corresponds to any change in tilt (e.g., 0±1°) from a reference tilt position. Using this shift of best-fit line, circle, or spot position, the workpiece position can be adjusted on the stage for the first workpiece in batch. The system can monitor and readjust accordingly during the operation for the rest of the workpieces in a batch. Individual correction also may be performed for each workpiece. The X and Y axes refer to perpendicular planar directions of the workpiece or the stage that holds the workpiece.

It should be noted that non-patterned workpieces do not produce any diffraction patterns, and as a result are generally unsuitable for determining twist accuracy and readjustment. However, the location of main reflected spot positioning along X-Y axis can be used to confirm and adjust the workpiece tilt.

FIG. 1 is a diagram of a system 100 for determining the twist angle 109 and tilt angle 110 of a workpiece 103 in accordance with some embodiments. The workpiece 103 may be a silicon wafer, SiC wafer, GaN wafer, or other types of workpieces. The twist angle 109 can be measured relative to a notch or flat on the workpiece 103 and a desired position of the notch or flat on the stage 102. The twist angle 109 is measured in the X-Y plane perpendicular to the Z axis. The Z axis can extend upward and a perpendicular angle from a planar surface of the stage 102 or the workpiece 103. Thus, the actual angular position of the notch, flat, or other a desired point on the workpiece 103 may be rotated relative to the stage 102. The tilt angle 110 can be measured relative to the stage 102. The tilt angle 110 can include angular differences caused by a workpiece 103 not resting flat on a surface of the stage 102. Thus, the tilt angle 110 means that the workpiece 103 is not flat in the X-Y plane of the stage 102 or is, for example, at least partially raised in the Z direction. The system 100 includes a chamber 101 with a chamber surface 106. The chamber 101 may be, for example, an end station, such as the one included in an ion implantation system as will be described in further detail hereinafter. The chamber 101 also can be a process chamber or another chamber that includes a stage 102 to support a workpiece 103. The chamber 101 may operate at reduced pressure, vacuum, atmospheric pressure, or a pressure above atmospheric pressure. For implantation applications, the chamber 101 operates at vacuum.

In the example of FIG. 1, the chamber surface 106 is a wall of the chamber 101. The chamber surface 106 may be clean and relatively polished. The chamber surface 106 can be planar or curved. The chamber surface 106 can be curved if how the angle of the chamber surface 106 changes as a function of dimension (e.g., height or side position) is known. The wall of the chamber 101 may be cleaned during preventative maintenance to ensure proper imaging. However, particles or other materials on the wall of the chamber 101 can be compensated for during or after imaging. In an example, dark particles on the wall of the chamber 101 may improve the contrast of a resulting image.

In an instance, a shutter (not illustrated) can be used to protect the chamber surface 106 and keep the chamber surface 106 clean. This shutter can cover the chamber surface 106 when the chamber surface is not being used to perform measurements.

As further illustrated in FIG. 1, a stage 102 is positioned in the chamber 101. The stage 102 can be, for example, an electrostatic chuck. Alternatively, the stage 102 may be a chuck that physically clamps the workpiece 103, a vacuum chuck, or a stage 102 that the workpiece 103 rests upon using gravity. The stage 102 can move in the X, Y, and/or Z axes, such as using the actuator 113.

A light source 104 directs an incident beam 105 at a surface of the workpiece 103 on the stage 102. The incident light 105 is directed at the surface of the workpiece 103 at an incident angle (θ) from >0° and <90°, including all angles and ranges therebetween. In an embodiment, the angle θ may range from about 5° to 85°. In another embodiment, the angle θ may range from about 10° to 80°. In yet another embodiment, the angle θ may range from about 30° to 60° or from about 30° to 45°. In an example, the angle θ may be approximately 45°.

In an instance, the light source 104 is a laser that generates predominantly red light. In experiments, red light provided a better diffraction pattern(s) than other visible wavelengths, but other visible wavelengths provided an acceptable diffraction pattern. Besides red light, the light source 104 can be a laser that generates predominantly blue or green light. In another instance, the light source 104 can be a laser that generates light within or across the visible wavelengths. In yet another instance, the light source 104 can be a laser that generates a wavelength outside the visible spectrum or wavelengths both inside and outside the visible spectrum.

In an instance, the incident beam 105 has a diameter from about 0.5 mm to 0.7 mm. The diameter of the incident beam 105 can be selected based on the dimensions of the devices on the workpiece 103 or other features of the workpiece 103. However, a larger diameter incident beam 105 may be utilized so as to be incident upon a greater number of devices or features on the workpiece 103, which may help when determining alignment because more of the integrated circuit pattern(s) defined on the workpiece 103 contributes to the resulting diffraction pattern 108. For example, the incident beam 105 may have a diameter up to approximately 10 mm. The area of the workpiece 103 that is sampled with the incident beam 105 may have reflecting structures to give a strong diffraction effect, but may have one spacing that dominates in both X and Y directions. Thus, the optimum diameter of the incident beam 105 may change between workpieces to provide this diffraction effect. For example, a larger incident beam 105 may be used if the integrated circuit pattern(s) defined on the workpiece 103 are larger. A larger incident beam 105 also may be used with smaller integrated circuit pattern(s) defined on the workpiece 103 because the additional structures may provide a better diffraction effect.

As further depicted in FIG. 1, a detector 107 is configured to image the diffraction pattern 108 of the incident beam 105 that is reflected off the workpiece 103. The diffraction pattern 108 is reflected onto the chamber surface 106. The detector 107 may, in an embodiment, be physically located inside the chamber 101 (as schematically depicted in FIG. 1) or, alternatively, may be located outside the chamber 101 (e.g., located to be able to image the diffraction pattern 108 through a window (not shown) in the chamber 101). In an instance, the detector 107 is a camera or photodiode. In an instance, the detector 107 is capable of imaging diffraction pattern changes of less than 0.01°.

Figure 5:
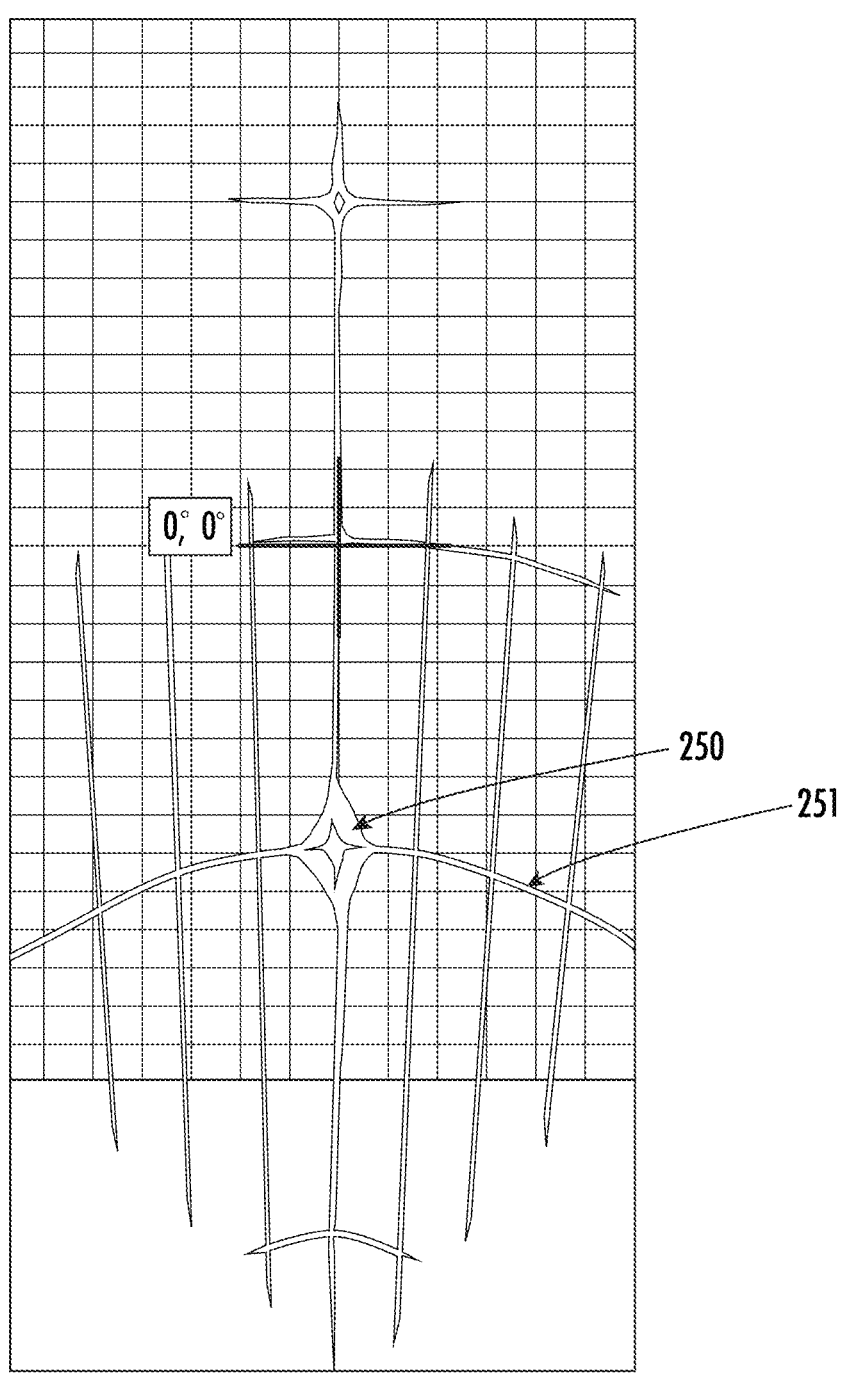
FIG. 5 is an image of an exemplary diffraction pattern.

FIG. 5 is an image of an exemplary diffraction pattern 251 of a patterned semiconductor wafer, which is an example of workpiece that can be used with the embodiments disclosed herein. The diffraction pattern 251 can be different from that illustrated in FIG. 5 based on, for example, the position, shape, design, and features of the workpiece. The vertical lines of the diffraction pattern 251 overlaid on the grid shown in FIG. 5 are aligned to the notch in the workpiece. The size of the patterned features on the workpiece can affect the spacing of these vertical lines in the diffraction pattern 251. If the placement of the notch on a patterned semiconductor wafer is known, then the patterned semiconductor wafer can be, for example, rotated to adjust the twist angle. Other adjustments or actions can be performed, which are described herein.

Turning back to FIG. 1, a processor 111 is in electronic communication with the detector 107. The processor 111 can be configured to determine a twist angle 109 and a tilt angle 110 of the workpiece 103 on the stage 102 based on the diffraction pattern 108. The processor 111 may include a programmable processor, which is programmed in software and/or firmware to carry out the functions that are described herein, along with suitable digital and/or analog interfaces for connection to the other elements of system 100. Alternatively or additionally, the processor 111 comprises hardwired and/or programmable hardware logic circuits, which carry out at least some of the functions of the processor 111. Although the processor 111 is shown in FIG. 1, for the sake of simplicity, as a single, monolithic functional block, in practice the processor 111 may comprise multiple, interconnected control units, with suitable interfaces for receiving and outputting the signals that are illustrated in the figures and are described in the text. Program code or instructions for the processor 111 to implement various methods and functions disclosed herein may be stored in readable storage media, such as a memory in the processor 111 or other memory.

In the embodiment of FIG. 1, the chamber has a base 112 (illustrated at the bottom of FIG. 1 under the stage 102). The base 112 can be, for example, a floor of a process chamber. The stage 102 is configured to hold the workpiece 103 so that the workpiece 103 is parallel to an inner surface of the base. Thus, gravity can assist when the workpiece 103 is held on the stage 102. Thus, gravity is directed in the Z axis in FIG. 1.

Figure 4:
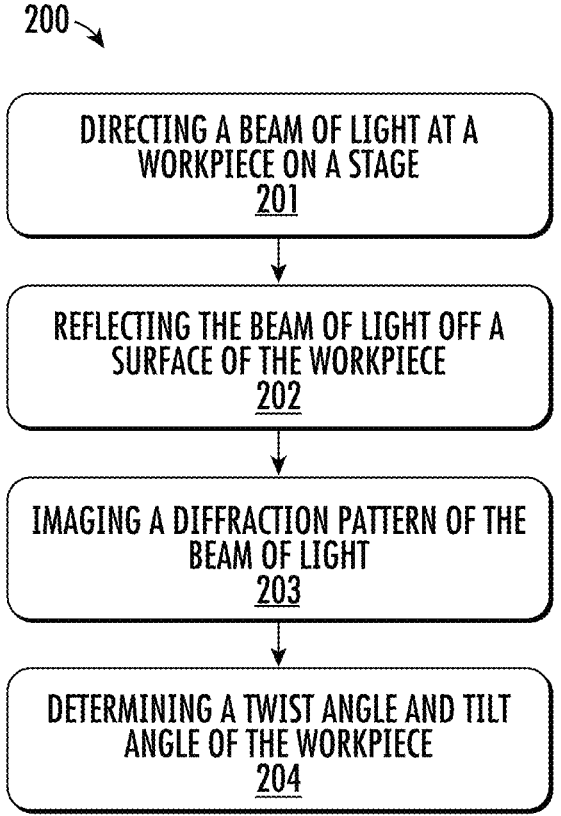
FIG. 4 is a flowchart of a method in accordance with the present disclosure.

FIG. 4 is a flowchart of a method 200. The method 200 can be performed in any of the embodiments of the system disclosed herein, such as system 100. At 201, an incident beam 105 is directed from a light source 104 at a workpiece 103 on a stage 102 in a chamber 101. The incident beam 105 is directed at the surface of the workpiece 103 at an oblique angle. The incident beam 105 can be a red laser beam or a laser beam of another wavelength or wavelengths. In an instance, the incident beam 105 is incident on the workpiece at an angle from >0° and <90°, such as from about 5° to 85°, from about 10° to 80°, from about 30° to 60°, or from about 30° to 45°. The stage 102 can hold the workpiece 103 in a horizontal or vertical position. In an instance, the workpiece 103 is a patterned semiconductor wafer. Other workpieces 103 are possible.

At 202, the incident beam 105 is reflected off a surface of the workpiece 103. A diffraction pattern 108 of the incident beam 105 that is reflected off the workpiece 103 is imaged at 203. The diffraction pattern 108 can be projected on a chamber surface 106 in the chamber 101 with the workpiece 103 or onto a detector 107 itself.

Using a processor 111, at least one of a twist angle and a tilt angle of the workpiece 103 on the stage 102 is determined based on the diffraction pattern at 204. The curvature of the diffraction pattern (e.g., the diffraction pattern 251 FIG. 5) can be used to find a center of the workpiece 103. A tangent of a circle at the center may be horizontal. If the tangent is known, then the center of the workpiece 103 can be determined because the radius of the workpiece 103 is perpendicular to the tangent where it touches the curvature of the workpiece 103. In another example, a circle is fit to the curvature (such as the curved part of the diffraction pattern 251 in, e.g., FIG. 5) and the center of the fitted circle is compared to a vertical line to find the center of the workpiece 103.

Tilt can be determined from the central spot in the diffraction pattern 108 in FIG. 1, which is labelled as 250 in FIG. 5. In FIG. 5, the spot 250 is part of the diffraction pattern 251. Tilting the workpiece 103 toward or away from light makes spot go down or up. Tilting left makes spot go left. Tilting right makes the spot go right. Twist makes the x-axis of the diffraction pattern non-orthogonal to the light, workpiece 103, and/or detector plane as the axis moves out of that plane. In an embodiment, the central spot is measured relative to a fiducial point, which can be established during an alignment step. An exemplary fiducial point is shown using the thicker crosshairs on the grid in FIG. 5.

For a non-patterned workpiece 103, the tilt angle can affect the shift of the central spot in the X-X or Y-Y direction, which can enable tilt confirmation. For a patterned workpiece 103, twist and tilt can affect shift of the diffraction pattern, which can enable tilt and twist confirmation.

The shape of the spot, such as the example 250 in FIG. 5, also can be used to determine tilt. The position of the spot can be used to determine a position in the Z direction (e.g., the height of the platen or other stage 102). The height of the platen or other stage 102 may not affect workpiece processing if the platen or other stage 102 is, for example, flipped to be in a path of an ion beam. However, the height of the platen or other stage 102 can diagnose a robot positioning error used during platen placement.

The workpiece 103 can be twisted and/or tilted on the stage 102 based on the twist angle and/or the tilt angle. This can be used as a form of process control. For example, one or more actuators 113 in the stage 102 or connected to the stage 102 can twist and/or tilt the workpiece, such as to align the workpiece 103 to a specification. In an instance, the workpiece 103 is twisted and/or tilted until the diffraction pattern 108 is flat. However, such twist and/or tilt adjustments are not always performed. After the relationship between the pattern shift and twist is determined, then the implant can proceed based on the relationship that was determined. An ion beam and/or placement of the stage 102 can compensate for any difference of the workpiece 103 from a desired twist and/or tilt position on the stage 102. For example, if the workpiece 103 is not positioned on the stage 102 at a desired position or angle, a position of the stage 102 can be adjusted to move the workpiece 103 to the desired position or angle.

Twisting and/or tilting the workpiece 103 on the stage 102 can be adjusted continuously. For example, twisting and/or tilting the workpiece 103 on the stage 102 can be performed in real-time as the twist angle and/or tilt angle is measured. The stage 102 can be moved until the twist and/or tilt of the workpiece meets a desired specification. Twisting and/or tilting the workpiece 103 on the stage 102 also can be performed sequentially, such as between implants of the workpiece 103 or different workpieces 103. In an example, twisting and/or tilting the workpiece 103 on the stage 102 can be performed periodically, such as between alternating workpieces 103 or for some of the workpieces 103 in a batch.

Besides adjusting the stage 102, the twist angle and/or the tilt angle can be used to adjust the tool. For example, ion beam optics upstream of the stage 102 can be adjusted based on the twist angle and/or the tilt angle. In an instance, a beam-steering apparatus can be adjusted based on the twist angle and/or the tilt angle. The ion source also can be adjust based on the twist angle and/or the tilt angle.

A workpiece 103 may be scrapped based on the twist angle and/or the tilt angle. If the twist angle and/or the tilt angle was incorrect or outside a specification, then a workpiece 103 may be scrapped. This can save manufacturing costs if a workpiece 103 cannot be compensated for during later processing or with an additional implant.

The functionality of the twist and/or tilt function of the stage 102 can be checked using the measured twist angle and/or tilt angle. The measurement of the twist and/or tilt of the workpiece 103 can be compared to a specification. This can be performed as part of an initialization or process control step during implant operations. A system interlock also can be used to prevent operation if twist angle and/or tilt angle is outside a specification.

A workpiece 103 can be sent back to an aligner for repositioning depending on the twist angle and/or tilt angle. Rather than adjusting the stage 102, the aligner can reposition the workpiece 103. The aligner can rotate the workpiece 103 when it is not on the stage 102. One or more robots can adjust placement of the workpiece 103 on the stage 102 as the workpiece 103 is moved to or from the stage 102.

A degree of workpiece 103 bowing can be determined based on a spot, such as the example 250 in FIG. 5. The degree of bowing can be used during processing of certain workpiece 103 susceptible to bowing, such as SiC workpieces. Bowing can be measured by finding the central spot for a workpiece 103 and moving the workpiece 103 under the incident light on the workpiece 103. As a height of the workpiece 103 varies, the center spot will move up and down.

Figure 2:
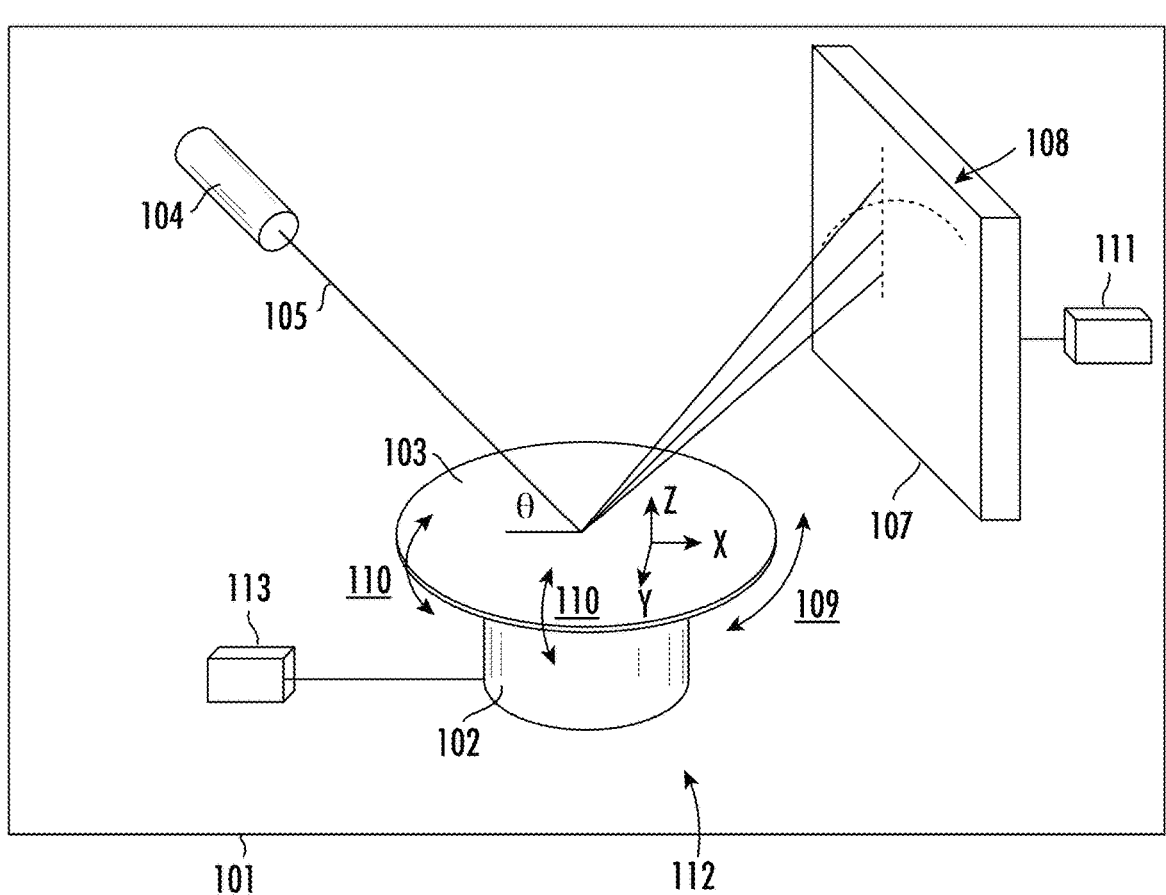
FIG. 2 is a diagram of another exemplary system for determining twist and tilt of a workpiece in accordance with the present disclosure.

FIG. 2 is a diagram of another system 120 for determining the twist angle 109 and tilt angle 110 of a workpiece 103. In the embodiment of FIG. 2, the detector 107 receives the incident beam 105 reflected off the workpiece 103. Thus, the detector 107 functions as an imaging device. The detector 107 can be, for example, a camera or photodiodes that provide spatial resolution. A camera can sample many spatial locations simultaneously. The camera may have associated optics to enable zooming onto the image. A small number of photodiodes may require that the pattern or the detector 107 be scanned, which can involve twisting and rotating the workpiece 103. The signal from the photodiodes can be used to reconstruct the image. In an instance, one or more linear arrays of photodiodes can be used as the detector 107 and the detector 107 can be translated to collect the image. The detector 107 also can be an array of photodiodes large enough to receive the entirety of the pattern.

Figure 3:
FIG. 3 is a diagram of another exemplary system for determining twist and tilt of a workpiece in accordance with the present disclosure.
Figure 3:

FIG. 3 is a diagram of another system 130 for determining the twist angle 109 and tilt angle 110 of a workpiece 103. In the embodiment of FIG. 3, the chamber has a base 112 (illustrated at the bottom of FIG. 3). The stage 102 is configured to hold the workpiece 103 perpendicular to an inner surface of the base 112. Thus, the stage 102 holds the workpiece 103 so that the workpiece 103 does not slip from the stage 102 due to gravity. The stage 102 may, for example, electrostatically or physically clamp the workpiece 103 to the stage 102. While illustrated as using detector 107 and chamber surface 106, the system 100 of FIG. 3 also can use the detector 107 of FIG. 2 that receives the incident beam 105 reflected off the workpiece 103. While illustrated with the light source 104 opposite of the chamber surface 106 along the X axis, the light source 104 also can be opposite of the chamber surface 106 along the Y axis (i.e., into and out of the page).

Other angular arrangements of the workpiece 103 on the stage 102 are possible besides those illustrated in FIGS. 1-3.

In the embodiments disclosed herein, the processor 111 also can be configured to analyze a speckle pattern of the diffraction pattern 108. This can be used to determine a surface measurement of the workpiece 103. This can provide information to supplement the twist and tilt information about the workpiece 103. A speckle pattern is a random intensity pattern created by the mutual interference of a set of wavefronts having different phases. The wavefronts combine to give a resultant wave with an amplitude, and therefore intensity, that randomly varies. The speckle pattern is not external noise. Rather, it is an inherent fluctuation in diffuse reflections because the scattering is not identical for each cell, and the coherent illumination wave is sensitive to small variations in phase changes. The speckle effect is a result of the interference of many waves of the same frequency, having different phases and amplitudes, which add together to provide a resultant wave with the random amplitude and intensity.

A speckle pattern can carry information about surface deformations on the workpiece 103. Speckle patterns are based on the surface of the workpiece 103 and can be formed by x-ray diffraction or other techniques. Roughness, porosity, strain, and stress can influence the distribution, size, or shape of the speckle pattern. The distribution, size, or shape can vary between workpieces 103 or even different parts of the same workpiece 103. With a patterned workpiece 103, wave interference can come from the surface structures (speckles) and diffraction from buried features (grating-like structures). The detector 107 can image the workpiece 103 to provide the speckle pattern.

The dimensions of the spots in a speckle pattern can provide information about surface deformations. Periodicity of devices on the workpiece also can be measured using the speckle pattern. Density and/or dimensions of the speckle pattern can provide information about the surface of the workpiece. For example, parameters such as correlation strengths and lengths can be used to provide information about surface deformations. Besides providing information about the surface, confirmation of the tilt angle can be performed using the specularly-reflected peak if the center of the main spot is evaluated. When the workpiece is perfectly flat, the reflected center spot will be at a fiducial spot, such as on the chamber wall. Tilting the workpiece toward or away from the incident light will make the reflection go up and down. An angle can be determined by measuring distance between the fiducial spot and the center spot.

Speckle pattern can be used to determine information about the workpiece surface, such as long-range order or degree of order of the workpiece surface, or can be used to determine information about amorphization conditions of a surface of a patterned or non-patterned workpiece. A speckle pattern of the diffraction pattern also can be analyzed using the processor to determine a surface measurement of the workpiece. For example, the speckle pattern can determine if the workpiece is amorphous. The workpiece also may be sensitive to films on the surface, which can be used to determine if the workpiece was incorrectly processed or if the workpiece is missing a film, has an extra film, or has an incorrect film on its surface.

In another embodiment, the speckle pattern can be used to find an orientation of the workpiece. A halo may be formed around a spot reflected off the workpiece. This halo is a spectra, which can be used for speckle analysis. An example is shown in FIG. 6C. The spot and the halo can be generally ellipsoid in shape. The degree to which the spot and halo are ellipsoidal can deviate from a specification, which can be used to determine orientation. The specification may provide an ideal ellipsoidal shape that corresponds to correct orientation. The ideal ellipsoid shape may vary with the workpiece material, film, or workpiece design.

In another embodiment, a non-transitory computer-readable storage medium includes one or more programs for executing steps on one or more computing devices. A diffraction pattern of an incident beam of light reflected off a surface of a workpiece on a stage is received. The incident beam is directed at the surface of the workpiece at an oblique angle. A twist angle and a tilt angle of the workpiece on the stage is then determined based on the diffraction pattern. Other determinations, such as those resulting from a speckle pattern analysis, also can be performed.

FIGS. 6A-6E, 7, 8A-8G, and 9A-9G show test data from various workpiece samples. The workpieces in these examples were semiconductor wafers.

Figure 6A:
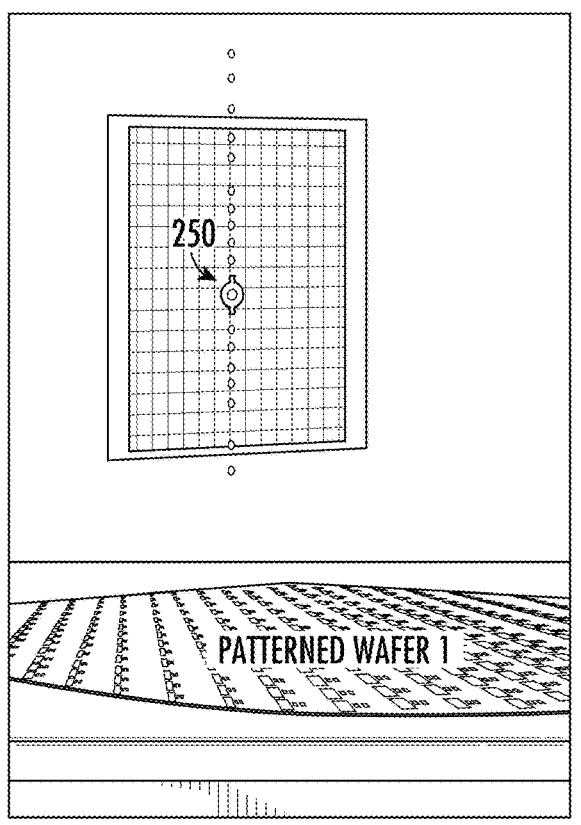
FIGS. 6A-6E, 7, 8A-8G, and 9A-9G show test data from various workpiece samples.
Figure 6B:
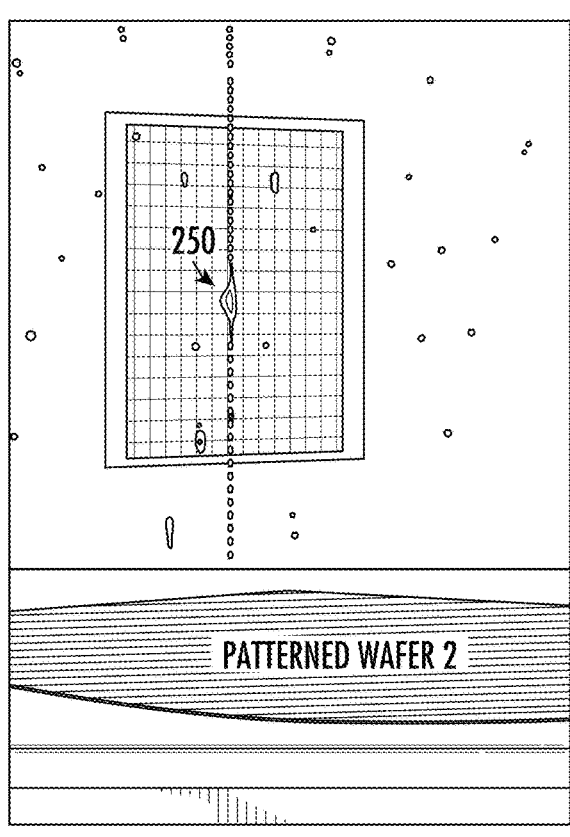
Figure 6C:
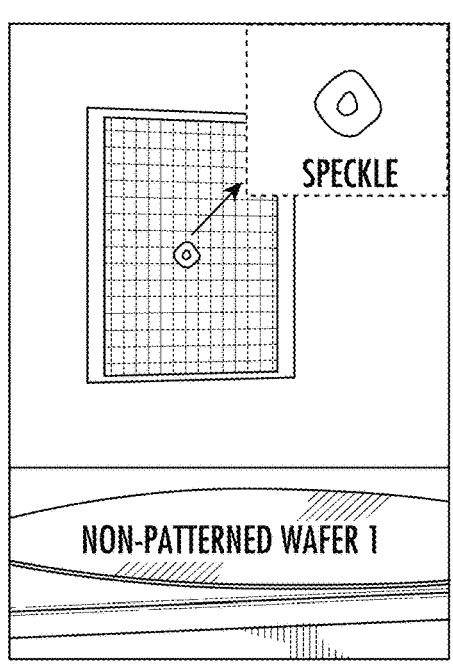
Figure 6D:
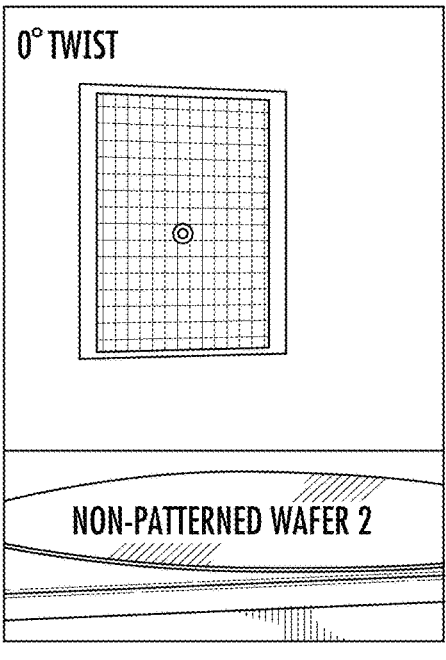
Figure 6E:
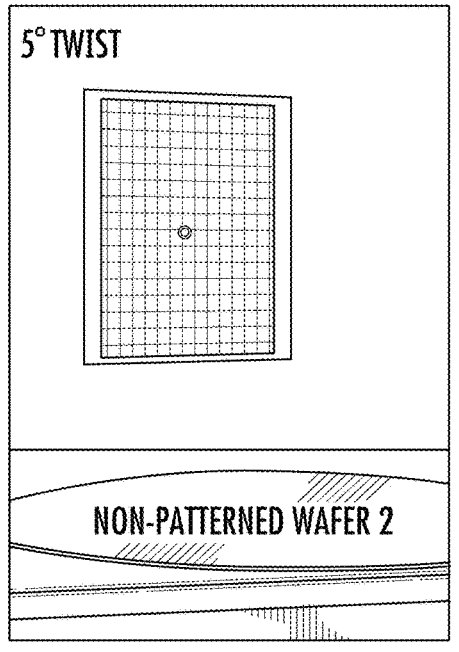

For example, FIGS. 6A-6E shows patterned and non-patterned wafers. FIGS. 6A-6B show two patterned wafers with a scattering pattern. FIGS. 6C-6E show two non-patterned wafers with a speckled pattern. The same wafer is used in FIGS. 6D and 6E. The scattering spots or X-Y pattern can be directional on the patterned wafer, but this can vary with the change in the pattern on the wafer. Scattering did not show additional scattering spots on bare, non-patterned wafers. Only a speckle pattern was visible on the bare, non-patterned wafers. Changes in speckle pattern on the bare, non-patterned wafers for 0° to 5° twist could not be judged visually. The speckle pattern also showed a strong influence of surface-near conditions on the bare, non-patterned wafers.

FIG. 6A and FIG. 6B show a scattering pattern for red laser light diffracted on patterned wafer. In addition to main laser spot shown as 250, additional circular, vertical, and/or horizontal line scattering patterns and speckles around the main laser spot were visible, which are shown with dots. The circular, vertical, and/or horizontal line shaped scattering pattern was caused by the ordered printed surface and/or subsurface structure on the wafer. The scattering pattern will be different for different patterned wafers because the printed surface or subsurface structures are not the same between the wafers.

FIGS. 6C-6E show a speckle pattern for red laser light diffracted on non-patterned bare wafer. In this example, one main laser spot and the surrounding speckles were visible on the image. A diffraction-type circular, vertical, and/or horizontal line shaped scattering pattern was not formed because there was no pattern printed on the surface or subsurface of the wafer. Comparing speckle patterns for twist angle of 0 degree and 5 degrees for the same sample (FIGS. 6D-6E) did not show any difference in speckle pattern. Compared to the wafer in FIGS. 6D-6E, the speckle pattern on the wafer in FIG. 6C was broader because surface and near-surface wafer structure of non-patterned wafer in FIG. 6C was rougher and/or has a more damaged crystal structure compared to the non-patterned wafer in FIGS. 6D-6E.

Figure 7:
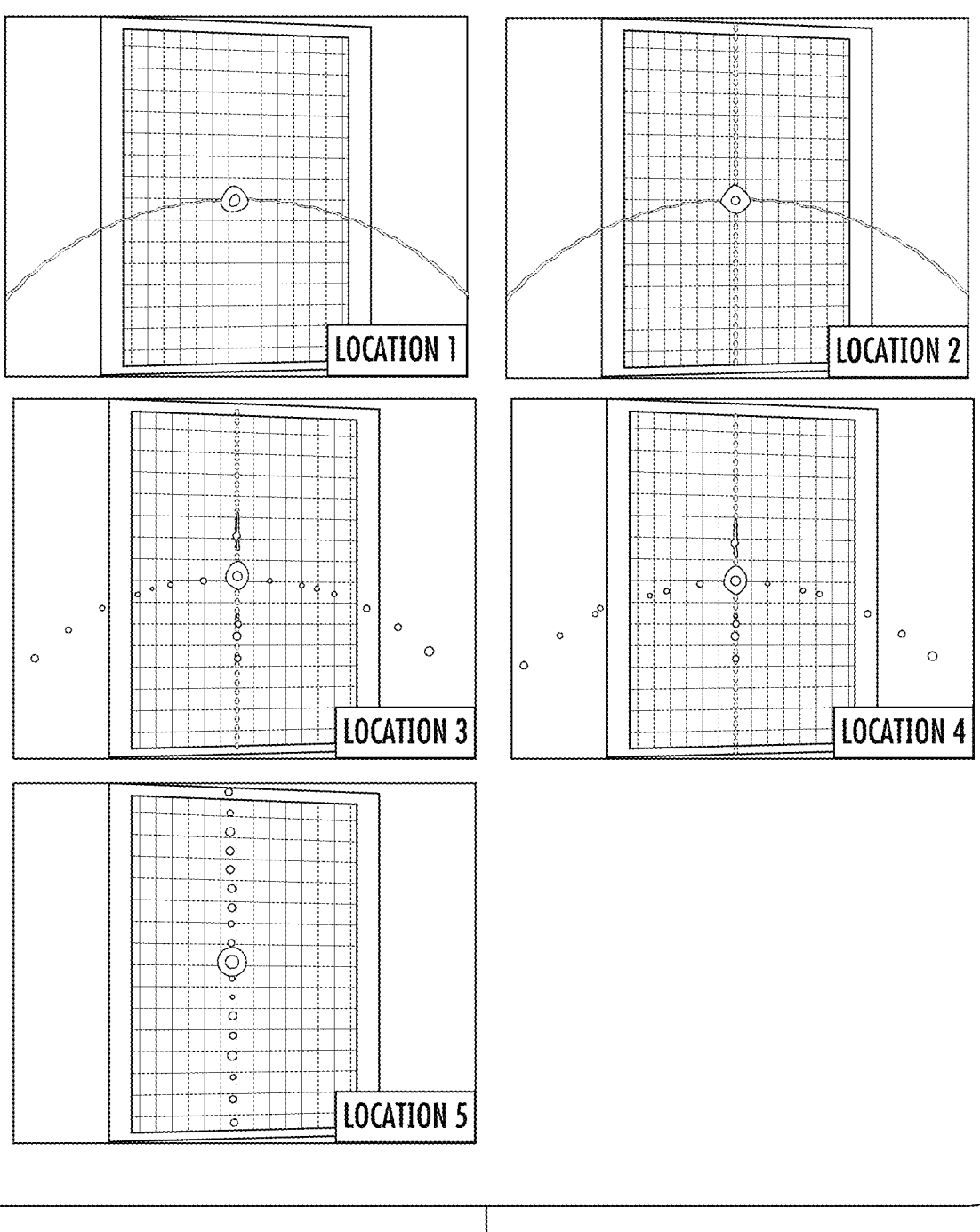

FIG. 7 illustrates how the scattering profile shape and size can vary between locations on a wafer. The scattering spots or line pattern were directional on the patterned wafer. Scattering patterns were obtained for various locations (labeled as Locations 1-5 in FIG. 7) of the same patterned wafer. A location that has a specific surface and/or subsurface printed structure will produce a particular representative circle and/or line-shaped scattering pattern. By changing placement of the laser spot or using a different sized laser spot that covers different areas of the surface or subsurface X-Y printed features, both circle and line-shaped scattering patterns are produced. These scattering patterns can be fit with circle and curved shaped lines. In this example, the scattering pattern varied with the local features at the focus area. The scattering profile showed low to moderate shift/changes that were detectable away from the center. Changes to the speckles were not noticeable with the naked eye.

FIGS. 8A-8F show a 30° incident light beam with the twist angle versus a best fit circle shift and with the X-X and Y-Y tilt angle versus spot shift.

Figure 8A:
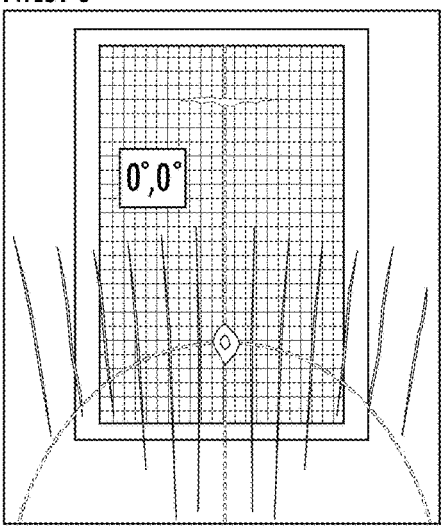
Figure 8B:
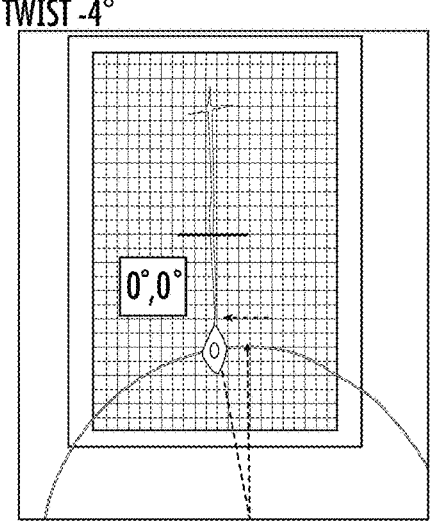
Figure 8C:
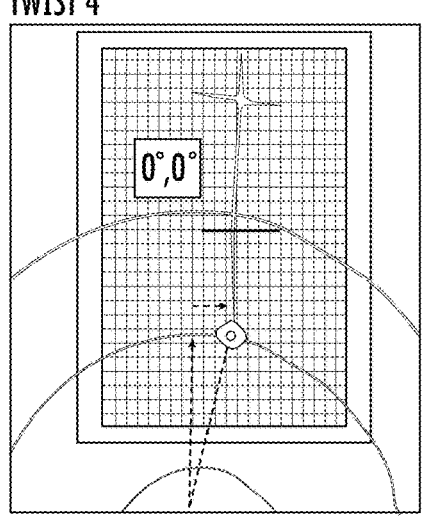

FIGS. 8A-8C show best fit circle and lines of the scattering pattern obtained for a patterned wafer for a 30° red laser incident angle. The scattering pattern and the best fit presented in FIG. 8A is for 0° wafer twist. FIG. 8B and FIG. 8C are for the wafer for –4° and 4° from the original 0° twist, respectively. A circle center shift was observed for both –4° and 4° twist cases, as shown in FIGS. 8A-8C.

Figure 8D:
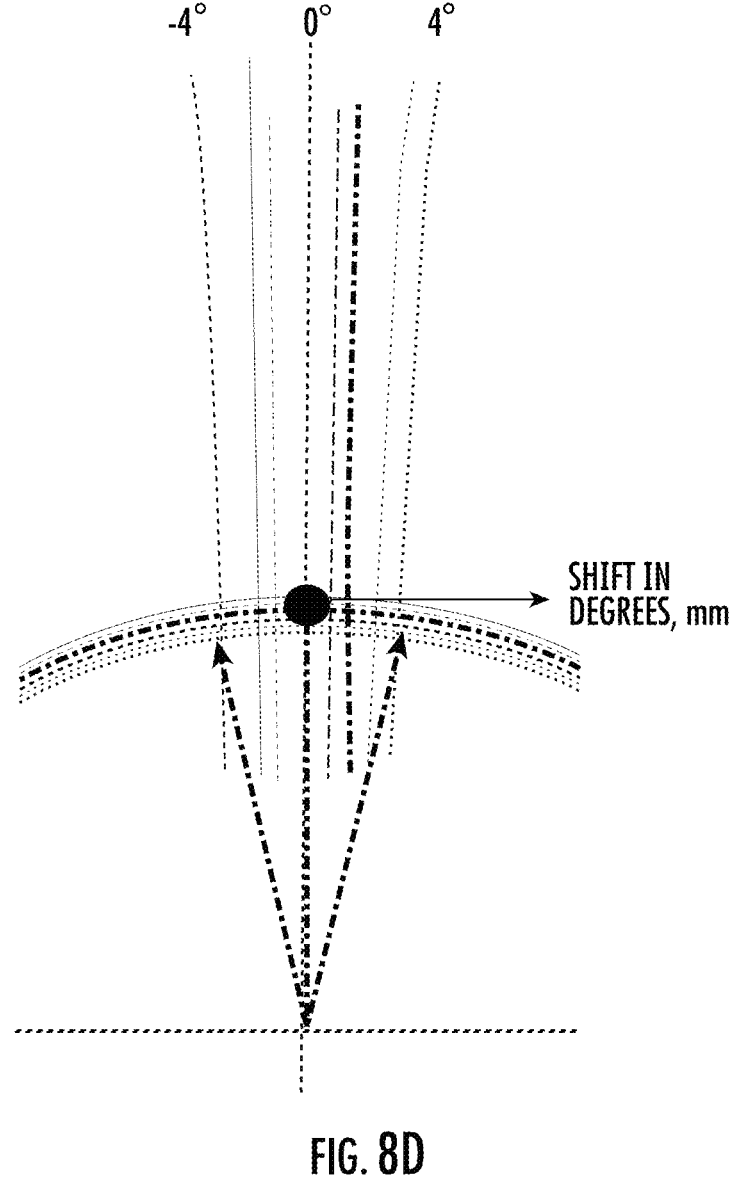
Figure 8E:
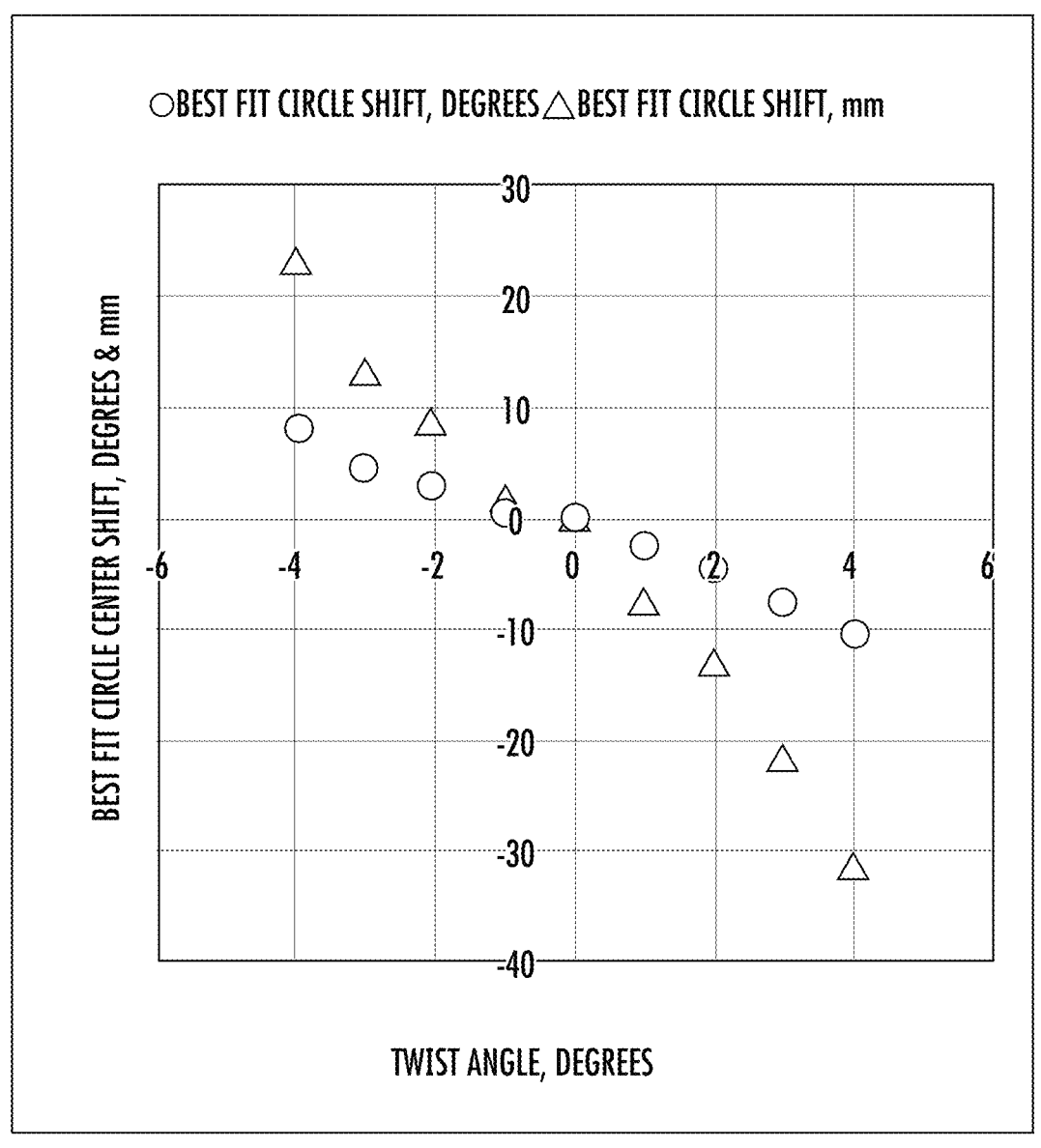

FIG. 8D shows best the circle and line fits for all wafer twist angles starting from –4° to 4°. Dashed arrows indicate the circle center shift in degrees and the solid arrow shows best fit line shifts in mm for various wafer twists. FIG. 8E shows the plot for best fit circle center and line shift as a function of wafer twist angle. The plot indicates a good systematic countable circle center shift in degrees and mm, which can be correlated to the wafer twist in either direction quantitatively.

Figures 8F, 8G:
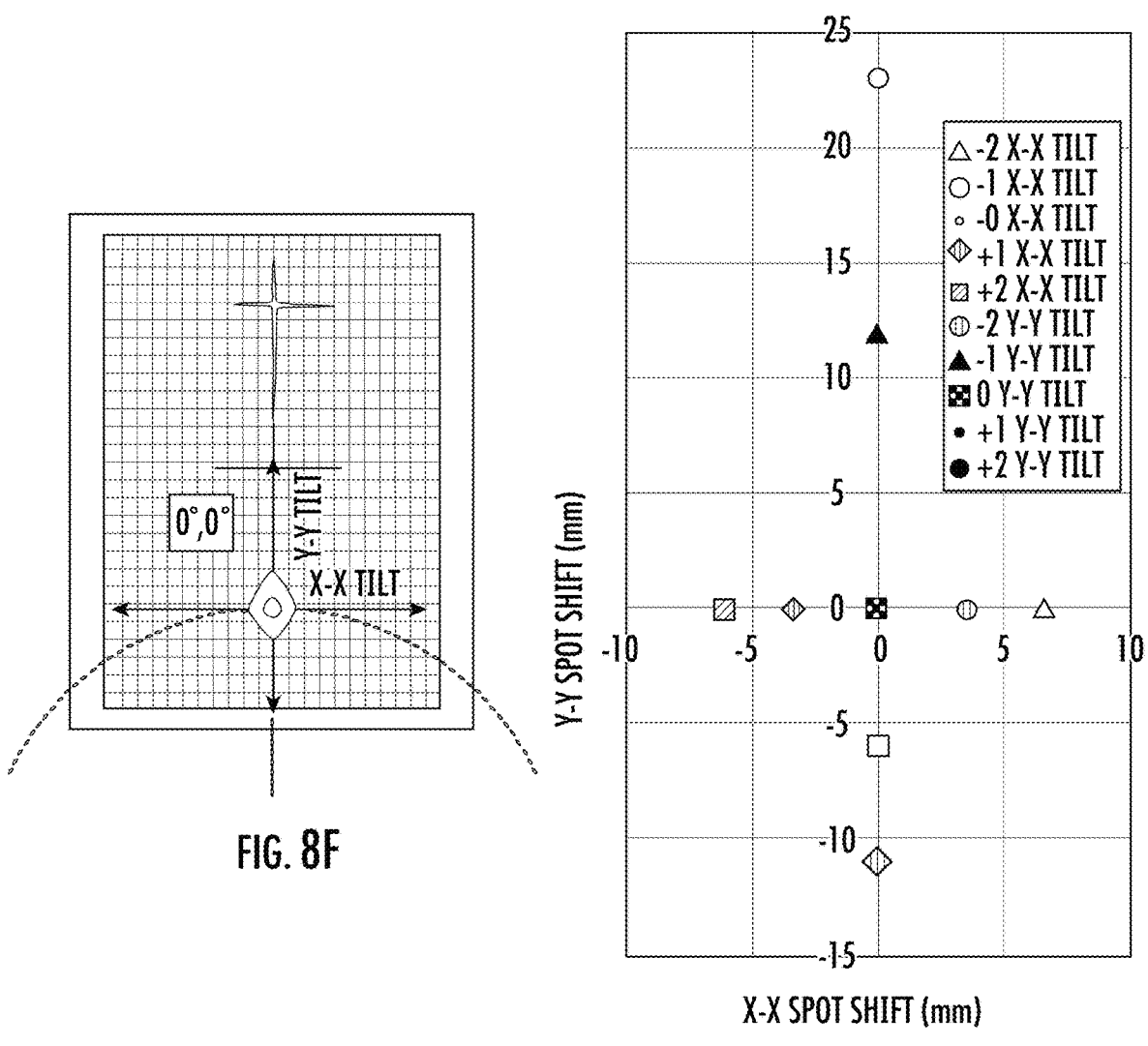

FIG. 8F shows best fit circle and lines of the scattering pattern obtained for patterned wafer for 30° red laser incident angle. A cross point of the solid arrows represents the position of the main laser spot. The direction of the arrows indicates possible main laser spot shift direction if an X-X tilt (horizontal in FIG. 8F) and/or Y-Y tilt (vertical in FIG. 8F) occurs.

FIG. 8G plots the shift of main laser spot in mm for the X-X and Y-Y tilt cases for +2° to –2°. The plot indicates that a good systematic countable shift in mm can be correlated to the wafer tilt along X-X direction (left-right of the wafer direction from wafer center) and Y-Y direction (front-back from the wafer center with respect to laser incidence) quantitatively.

FIGS. 9A-9F shows a 45° incident light beam with the twist angle versus a best fit circle shift and with the X-X and Y-Y tilt angle versus spot shift.

Figures 9A, 9B, 9C:
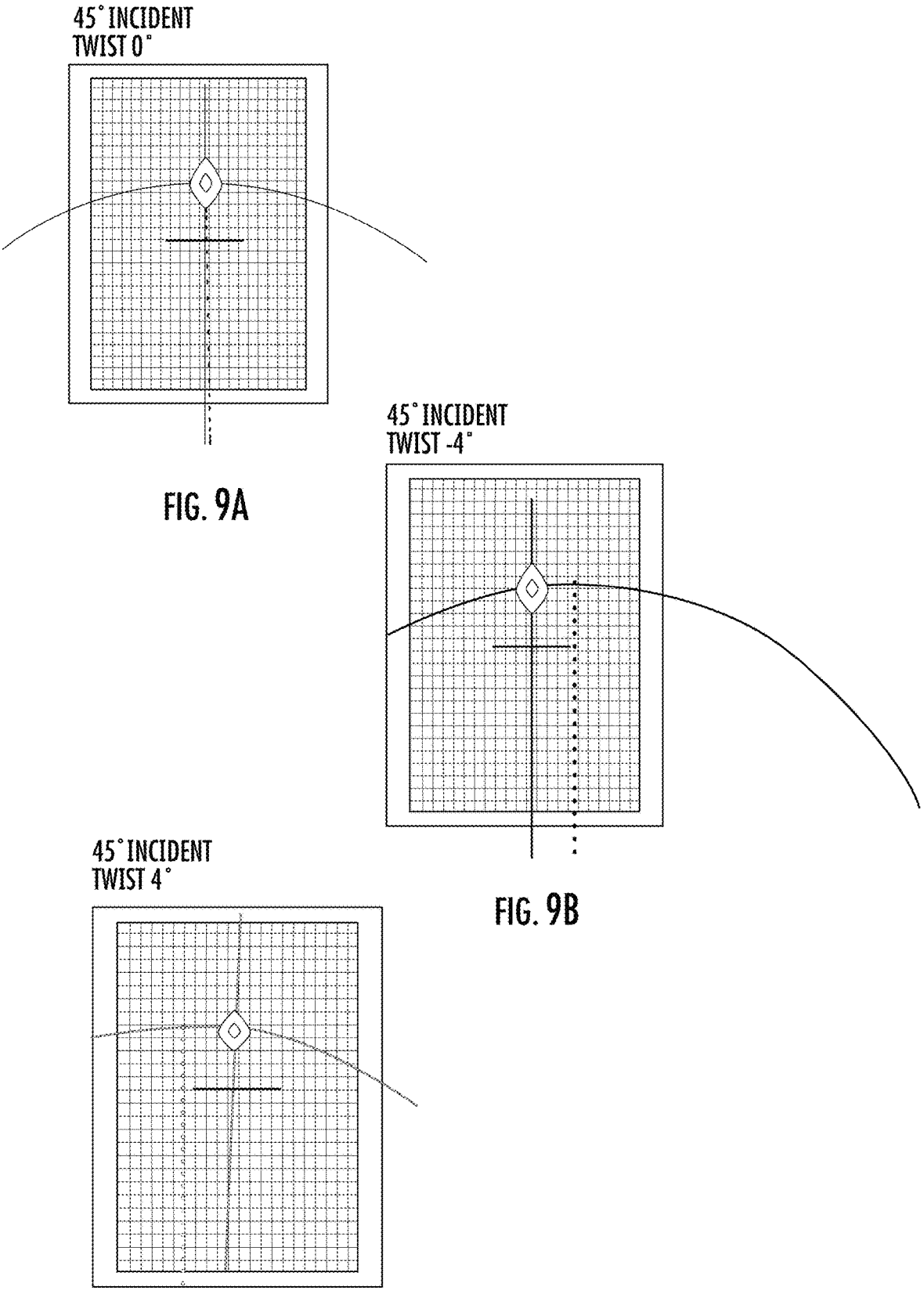

FIGS. 9A-9C show best fit circle and lines of the scattering pattern obtained for patterned wafer for 45° red laser incident angle. The scattering pattern and the best fit presented in FIG. 9A is for 0° wafer twist. FIG. 9B and FIG. 9C are for the wafer for –4° and 4° from the original 0° twist, respectively. A circle center shift was observed for both –4° and 4° twist cases.

Figure 9D:
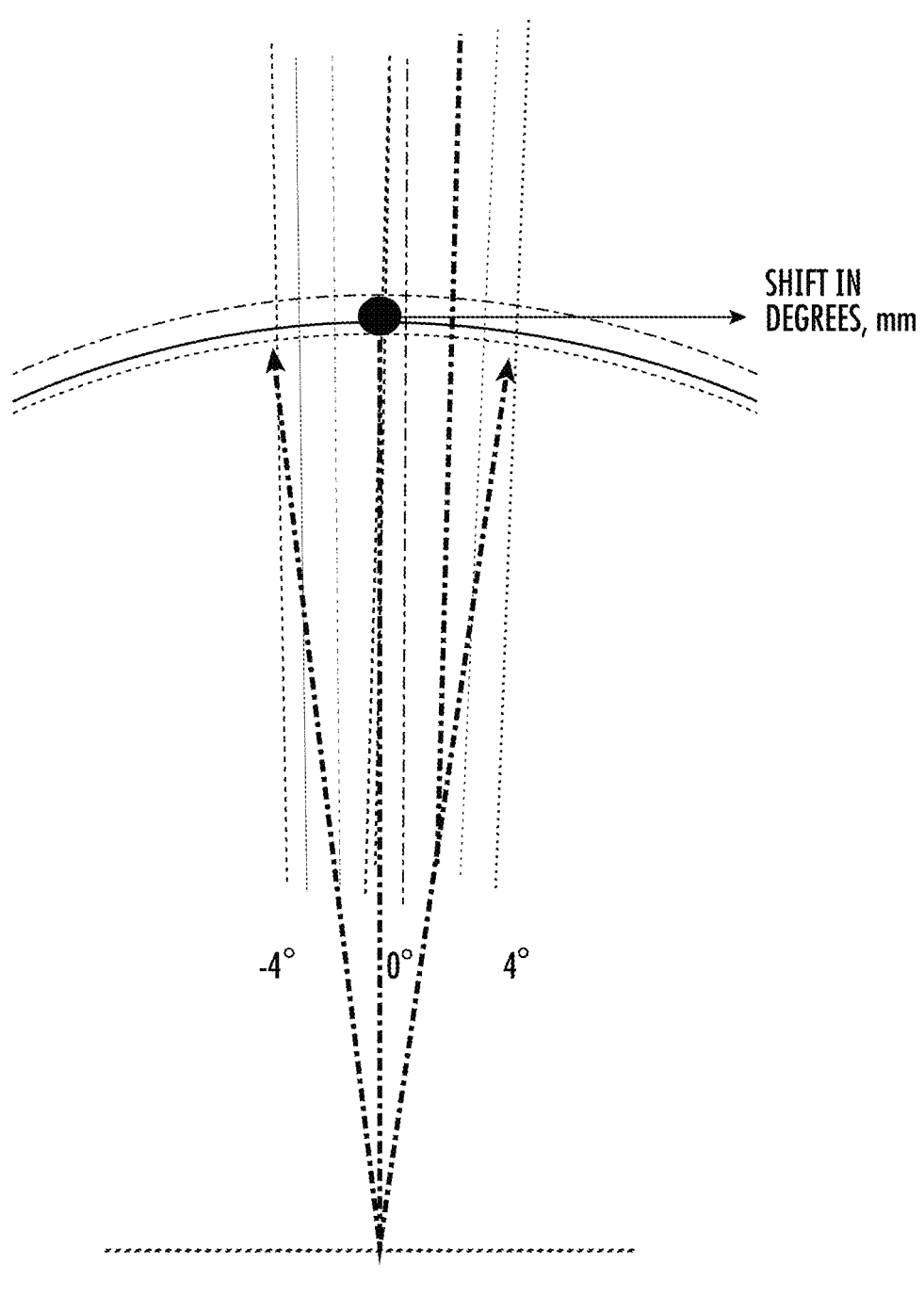
Figure 9E:
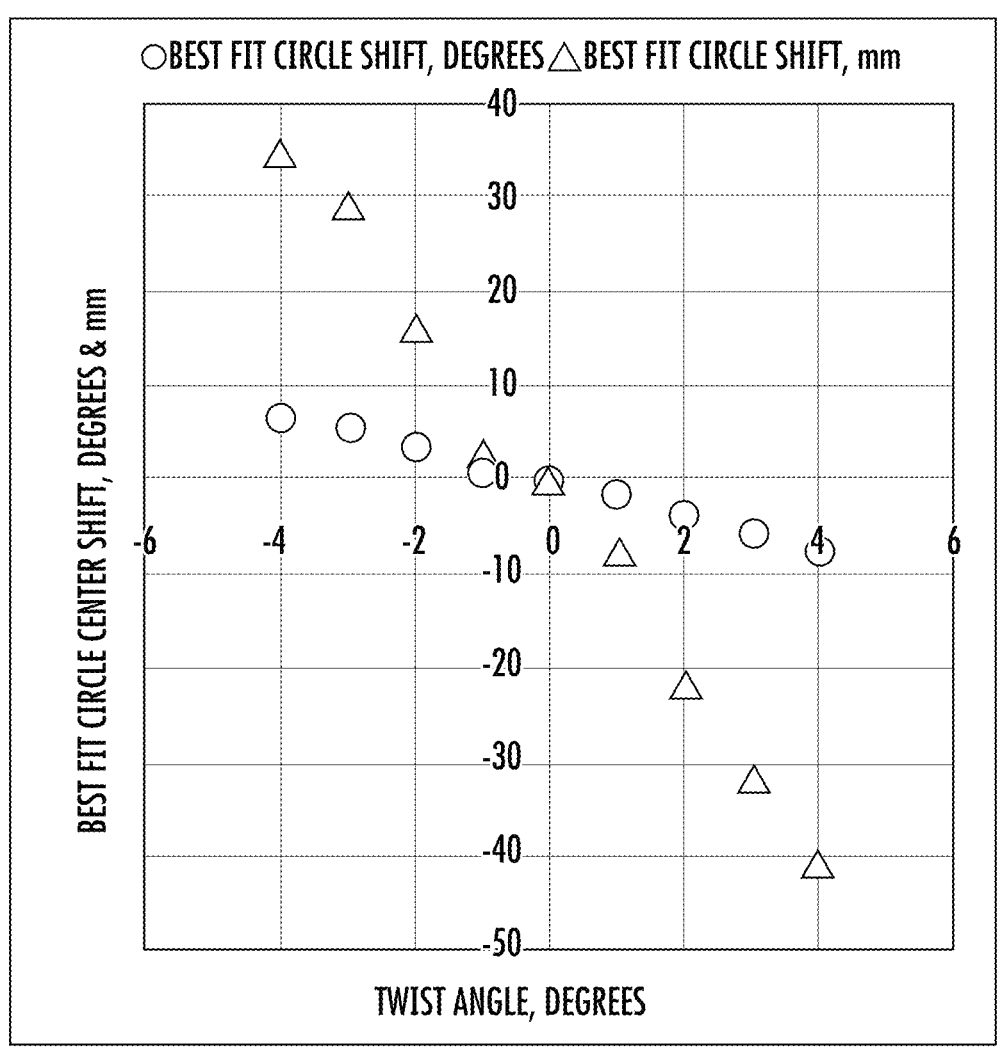

FIG. 9D shows best the circle and line fits for all wafer twist angles starting from –4° to 4°. Dashed arrows indicate the circle center shift in degrees and the solid arrow shows best fit line shifts in mm for various wafer twists. FIG. 9E shows the plot for best fit circle center and line shift as a function of wafer twist angle. The plot indicates a good systematic countable circle center shift in degrees and mm, which can be correlated to the wafer twist in either direction quantitatively.

Figures 9F, 9G:
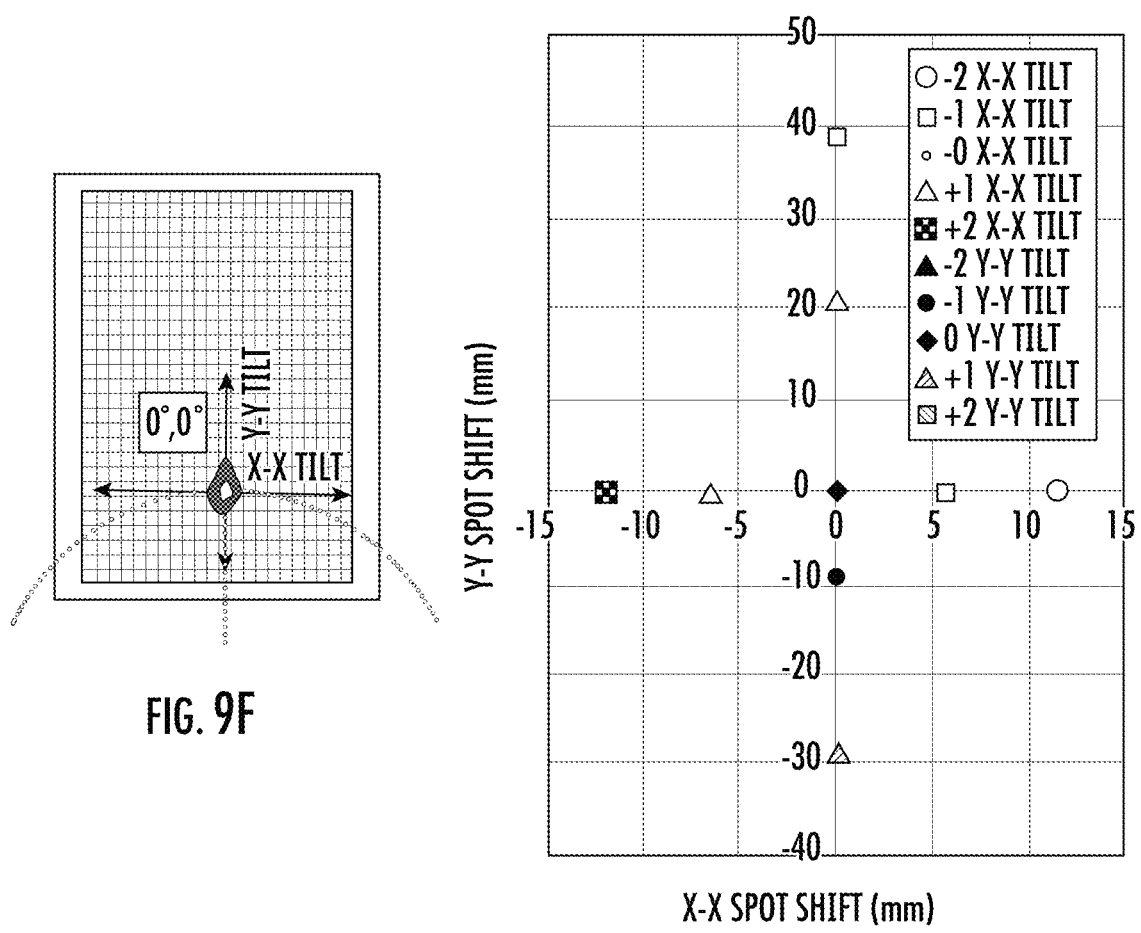

FIG. 9F shows best fit circle and lines of the scattering pattern obtained for patterned wafer for 45° red laser incident angle. A cross point of the solid arrows represents the position of the main laser spot, and the direction of the arrows indicate possible main laser spot shift direction if a X-X tilt (horizontal in FIG. 9F) and/or Y-Y tilt (vertical in FIG. 9F) occurs.

FIG. 9G plots the shift of main laser spot in mm for the X-X and Y-Y tilt cases for +2° to –2°. The plot indicates that a good systematic countable shift in mm can be correlated to the wafer tilt along X-X direction (left-right of the wafer direction from wafer center) and Y-Y direction (front-back from the wafer center with respect to laser incidence) quantitatively.

Figure 10:
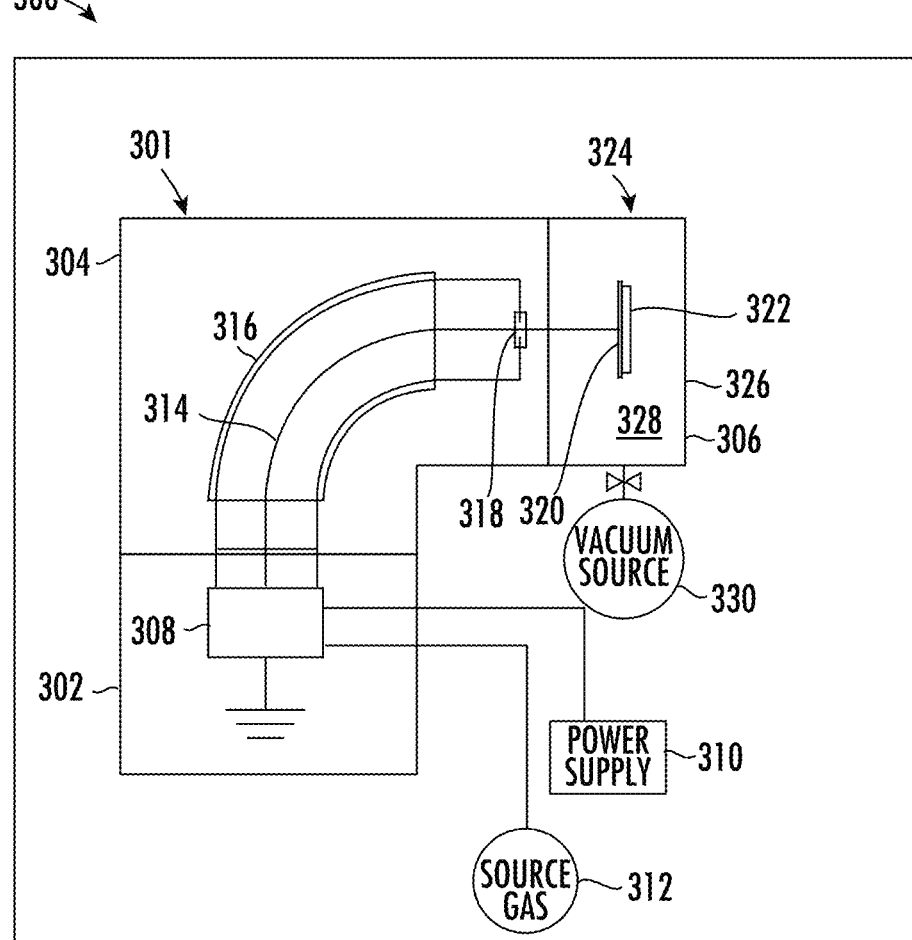
FIG. 10 is a block diagram of an exemplary vacuum system utilizing an ion source with a target in accordance with the present disclosure.

FIG. 10 illustrates an exemplified vacuum system 300 that may implement various apparatus, systems, and methods of the present disclosure. The vacuum system 300 includes an ion implantation system 301, however various other types of vacuum systems are also contemplated, such as plasma processing systems or other semiconductor processing systems. The ion implantation system 301, for example, comprises a terminal 302, a beamline assembly 304, and an end station 306.

Generally speaking, an ion source 308 in the terminal 302 is coupled to a power supply 310, whereby a gas from a gas source 312 (also called a dopant gas) supplied thereto or material from a target is ionized into a plurality of ions to form an ion beam 314. The ion beam 314 is directed through a beam-steering apparatus 316 and out an aperture 318 toward the end station 306. In the end station 306, the ion beam 314 bombards a workpiece 320 (e.g., a semiconductor such as a silicon wafer, SiC wafer, a display panel, etc.), which is selectively clamped or mounted to a stage 322 (e.g., an electrostatic chuck). Once embedded into the lattice of the workpiece 320, the implanted ions change the physical and/or chemical properties of the workpiece 320. Because of this, ion implantation is used in semiconductor device fabrication and in metal finishing, as well as various applications in materials science research.

The ion beam 314 of the present disclosure can take any form, such as a pencil or spot beam, a ribbon beam, a scanned beam, or any other form in which ions are directed toward end station 306, and all such forms are contemplated as falling within the scope of the disclosure.

The end station 306 includes a process chamber 324, such as a vacuum chamber 326, wherein a process environment 328 is associated with the process chamber. The process environment 328 within the process chamber 324, for example, comprises a vacuum produced by a vacuum source 330 (e.g., a vacuum pump) coupled to the process chamber 324 and configured to substantially evacuate the process chamber 324. A controller 332 is provided for overall control of the vacuum system 300. The controller 332 can include the processor 111 or may be separate from the processor 111.

The ion source 308 (also called an ion source chamber), for example, can be constructed using refractory metals (W, Mo, Ta, etc.) and graphite in order to provide suitable high temperature performance, whereby such materials are generally accepted by semiconductor manufacturers. The gas from the gas source 312 is used within the ion source 308. The source gas may or may not be conductive in nature.

The vacuum system 300 can use any of the embodiments disclosed herein. Thus, the end station 306 can include the components of the system 100 disclosed herein, such as the light source 104, the detector 107, or the chamber surface 106. The end station 306 may be an example of a chamber 101 and the stage 322 may be an example of a stage 110. The workpiece 320 can be an example of the workpiece 103. In an instance, a wall of the end station 306 is the chamber surface 106.

The embodiments of the present disclosure also may be implemented in various semiconductor processing equipment such as that for chemical vapor deposition (CVD), physical vapor deposition (PVD), metal organic chemical vapor deposition (MOCVD), chemical-mechanical polishing (CMP), etching, and various other semiconductor processing applications, and all such implementations are contemplated as falling within the scope of the present disclosure.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a chamber;
a stage configured to hold a workpiece, wherein the stage is disposed within the chamber;
a light source configured to direct an incident beam at a patterned surface of the workpiece on the stage, wherein the incident beam is directed at the patterned surface of the workpiece at an oblique angle;
a detector configured to image a diffraction pattern produced by the incident beam reflected off the patterned surface of the workpiece, wherein the diffraction pattern comprises a central spot; and
a processor in electronic communication with the detector, wherein the processor is configured to determine at least one of a twist angle and a tilt angle of the workpiece on the stage based on the diffraction pattern, wherein determining at least one of the twist angle and the tilt angle includes determining a circle center shift of the diffraction pattern based on the central spot.

2. The system of claim 1, wherein the light source is a laser and the incident beam is predominantly red light.

3. The system of claim 1, wherein the incident beam has a diameter from 0.5 mm to 0.7 mm.

4. The system of claim 1, wherein the incident beam is incident on the workpiece at an angle from 30° to 60°.

5. The system of claim 1, wherein the detector is a camera.

6. The system of claim 1, wherein the stage is an electrostatic chuck.

7. The system of claim 1, wherein the chamber has a chamber surface, wherein the incident beam is reflected off the workpiece onto the chamber surface, and wherein the diffraction pattern is imaged on the chamber surface by the detector.

8. The system of claim 1, wherein the detector directly receives the incident beam reflected off the patterned surface of the workpiece.

9. The system of claim 1, wherein determining at least one of the twist angle and the tilt angle further includes determining a curvature of the diffraction pattern and determining a center of the workpiece.

10. The system of claim 1, wherein the processor is further configured to analyze a speckle pattern of the diffraction pattern thereby determining a surface measurement of the workpiece.

11. A method comprising:
directing an incident beam from a light source at a workpiece on a stage in a chamber, wherein the incident beam is directed at a patterned surface of the workpiece at an oblique angle;
reflecting the incident beam off the patterned surface of the workpiece to produce a diffraction pattern, wherein the diffraction pattern comprises a central spot;
imaging the diffraction pattern of the incident beam that is reflected off the patterned surface of the workpiece; and
determining, using a processor, at least one of a twist angle and a tilt angle of the workpiece on the stage based on the diffraction pattern, wherein determining at least one of the twist angle and the tilt angle includes determining a circle center shift of the diffraction pattern based on the central spot.

12. The method of claim 11, wherein the light source is a laser and the incident beam is predominantly red light.

13. The method of claim 11, wherein the incident beam is incident on the workpiece at an angle from 30° to 60°.

14. The method of claim 11, further comprising twisting and/or tilting the workpiece on the stage based on the twist angle and/or the tilt angle.

15. The method of claim 11, wherein the workpiece is a patterned semiconductor wafer.

16. The method of claim 11, wherein determining at least one of the twist angle and the tilt angle further includes determining a curvature of the diffraction pattern and determining a center of the workpiece.

17. The method of claim 11, further comprising analyzing a speckle pattern of the diffraction pattern using the processor thereby determining a surface measurement of the workpiece.

18. A non-transitory computer-readable storage medium, comprising one or more programs for executing the following steps on one or more computing devices:
receiving a diffraction pattern produced by an incident beam of light reflected off a patterned surface of a workpiece on a stage, wherein the incident beam is directed at the patterned surface of the workpiece at an oblique angle, and the diffraction pattern comprises a central spot; and
determining at least one of a twist angle and a tilt angle of the workpiece on the stage based on the diffraction pattern, wherein determining at least one of the twist angle and the tilt angle includes determining a circle center shift of the diffraction pattern based on the central spot.

19. The method of claim 11, wherein the diffraction pattern is imaged by a detector that directly receives the incident beam reflected off the patterned surface of the workpiece.

20. The non-transitory computer-readable storage medium of claim 18, wherein the diffraction pattern is imaged by a detector that directly receives the incident beam reflected off the patterned surface of the workpiece.

\* \* \* \* \*